Jan. 12, 1960 G. F. ABBOTT, JR 2,921,140

LINE CIRCUIT

Filed Dec. 31, 1957 4 Sheets-Sheet 1

INVENTOR
G. F. ABBOTT, JR.
BY Harold C. Herman
ATTORNEY

Jan. 12, 1960 G. F. ABBOTT, JR 2,921,140

LINE CIRCUIT

Filed Dec. 31, 1957 4 Sheets-Sheet 2

INVENTOR
G. F. ABBOTT, JR.
BY *Harold C. Herman*
ATTORNEY

INVENTOR
G. F. ABBOTT, JR.
BY Harold C. Herman
ATTORNEY

LINE CIRCUIT

Filed Dec. 31, 1957 4 Sheets-Sheet 4

INVENTOR
G. F. ABBOTT, JR.
BY Harold C. Herman
ATTORNEY

United States Patent Office 2,921,140

Patented Jan. 12, 1960

2,921,140

LINE CIRCUIT

George F. Abbott, Jr., Pearl River, N.Y., assignor to Bell Telephone Laboratories, Incorporated, New York, N.Y., a corporation of New York Application December 31, 1957, Serial No. 706,474

10 Claims. (Cl. 179—18)

This invention relates to line circuits for supplying indications of the condition of a number of lines and more particularly to line circuits for signaling the service condition of subscriber lines in a line concentrator telephone system.

In the patent application Serial No. 706,342, filed on even date herewith by Abbott-Krom-Mehring-Whitney, there is disclosed a line concentrator telephone system which includes remotely located line concentrators for providing connections between a large number of subscriber lines and a small number of talking trunks extending from a central office. The line concentrator system effects considerable saving in the cost of operation of the telephone plant by avoiding the necessity of providing a separate direct connection from the central office to each subscriber line. As the central office is not directly in information communication with the subscriber lines due to the interposition of the remote line concentrator, provision is necessary for informing the central office of the service condition of each of the subscriber lines as needed. The line service conditions include the idle condition, in which there is no connection through a line concentrator to the central office, the busy condition, in which there is such a connection, and the service request condition, in which the subscriber line is in a calling condition but not connected through the line concentrator to the central office.

The line concentrator system disclosed by Abbott-Krom-Mehring-Whitney includes a central office memory circuit which registers information relating to established connections through the line concentrators. The memory circuit is consulted to determine if a particular line or trunk is busy. Only the idle and service request conditions of the subscriber lines need therefore be determined at the line concentrator.

It is a general object of this invention to provide an improved line circuit for generating signals indicative of the service condition of a number of lines.

More specifically, it is an object of this invention to provide an improved concentrator line circuit for generating indications of the idle and service request conditions of a number of subscriber lines terminating at a line concentrator.

In an illustrative embodiment of this invention, the concentrator line circuit recognizes a service request condition and initiates a sequence of operations for establishing a dial-tone, or originating, connection for the service requesting line. The connection is from the service requesting line through the line concentrator and one of the concentrator trunks to equipment in the central office which supplies dial tone. The dial-tone supply equipment may, for example, be an originating register of the type disclosed in the Patent 2,585,904 which issued to A. J. Busch on February 19, 1952. The central office equipment holds the originating connection and supplies dial tone as long as the connection presents a direct-current impedance below a predetermined level. If the loop resistance is, or becomes, greater than the predetermined level, the call is considered abandoned and a disconnect sequence is initiated. If the concentrator line circuit recognizes a service request of a line resistance greater than the predetermined holding level, the central office will fail to recognize the request and the originating connection will be cyclically established and disconnected.

In telephone parlance, the cyclic establishment and disconnection of a line connection is referred to as a showering condition. A showering condition is avoided by either restricting the sensitivity of line relays, etc., that recognize the service request, or by increasing the holding resistance level of the dial-tone supply equipment. It is generally desirable, however, to utilize the longest possible subscriber lines, which require greater sensitivity, and the lowest possible holding resistance level. A relatively low holding resistance is desirable to insure the recognition of abandoned calls in the presence of line leakage. As a compromise to these incompatible conditions some showering is usually permitted. The line length and holding level are set to prevent showering for most component variations. The margin against showering is determined therefor by the variation margin of the components utilized to recognize the service request and to hold the originating connection.

It is another object of this invention to improve the margin against showering in a line concentrator telephone system without changing the line lengths or holding resistance level.

Line concentrator telephone systems are particularly susceptible to showering conditions because the line loop connected to the remote concentrator becomes part of the loop connected from the subscriber's station to the central office equipment. The entire loop from the subscriber's station to the central office therefore presents greater resistance than the subscriber's line alone. Since the line concentrator may be proximately as well as distantly located from the central office, it must be able to recognize a service request from relatively long lines. But, if the concentrator is located at a distance from the central office, the added resistance due to the concentrator trunk causes the total possible originating resistance to exceed the holding resistance level. The margins against showering in line concentrator systems have for this reason been poor.

Still another object of this invention is to provide a line circuit that is readily adjustable to respond to different loop impedances to permit locating the line concentrator within a range of distances from the central office without reducing the margins against showering.

Still another object of this invention is to provide a number of line circuits having readily adjustable sensitivities by an adjustor common to all the line circuits.

A further object of this invention is to provide a line circuit having a sensitivity that is adjustable over a wide range.

In the illustrative embodiment of the invention the line circuitry includes a transistor gate for each of the subscriber lines. The transistor gate, which is enabled when the subscriber line is in a service request condition, is part of a line scanning system which functions to cyclically scan the subscriber lines. The scanning sequence includes a number of group pulses which select groups of lines and a number of file pulses which select the individual lines in the group. When a group of lines is selected, a transistor group switch is operated to enable the transistor line gates in the group. Thereafter, when a line is in a service request condition, the file pulse corresponding to the line passes through the associated enabled transistor gate and allows a pulse to be supplied to a service request detector.

A feature of this invention pertains to the provision of a transistor gate which functions to reduce the margin against showering. When the threshold point between an on-hook and an off-hook condition is reached, the gain of the transistor gate causes the marginal region between recognition to these two conditions to be very narrow. A marginal region between a definite on-hook and a definite off-hook condition exists because of variations in components, power supplies, etc. utilized to determine the service condition. When the transistor gate is operated, it isolates the subscriber line to reduce the effect of component and supply variations.

Another feature of this invention pertains to the provision of a line circuit which is adjustable to provide for a close control of the threshold point at which a service request condition is detected. With an adjustable threshold the line concentrator may be located adjacent or at a distance from the central office. The threshold is adjusted by varying a control potential provided to the group switches. A single adjustment, in this manner, changes the sensitivity of all the line circuits in the concentrator.

Further objects and features of this invention will become apparent from the following description and the accompanying drawing wherein:

Figs. 1 and 2, when arranged with Fig. 2 at the right of Fig. 1, are a circuit representation of the line circuit of the present invention;

Figure 1:
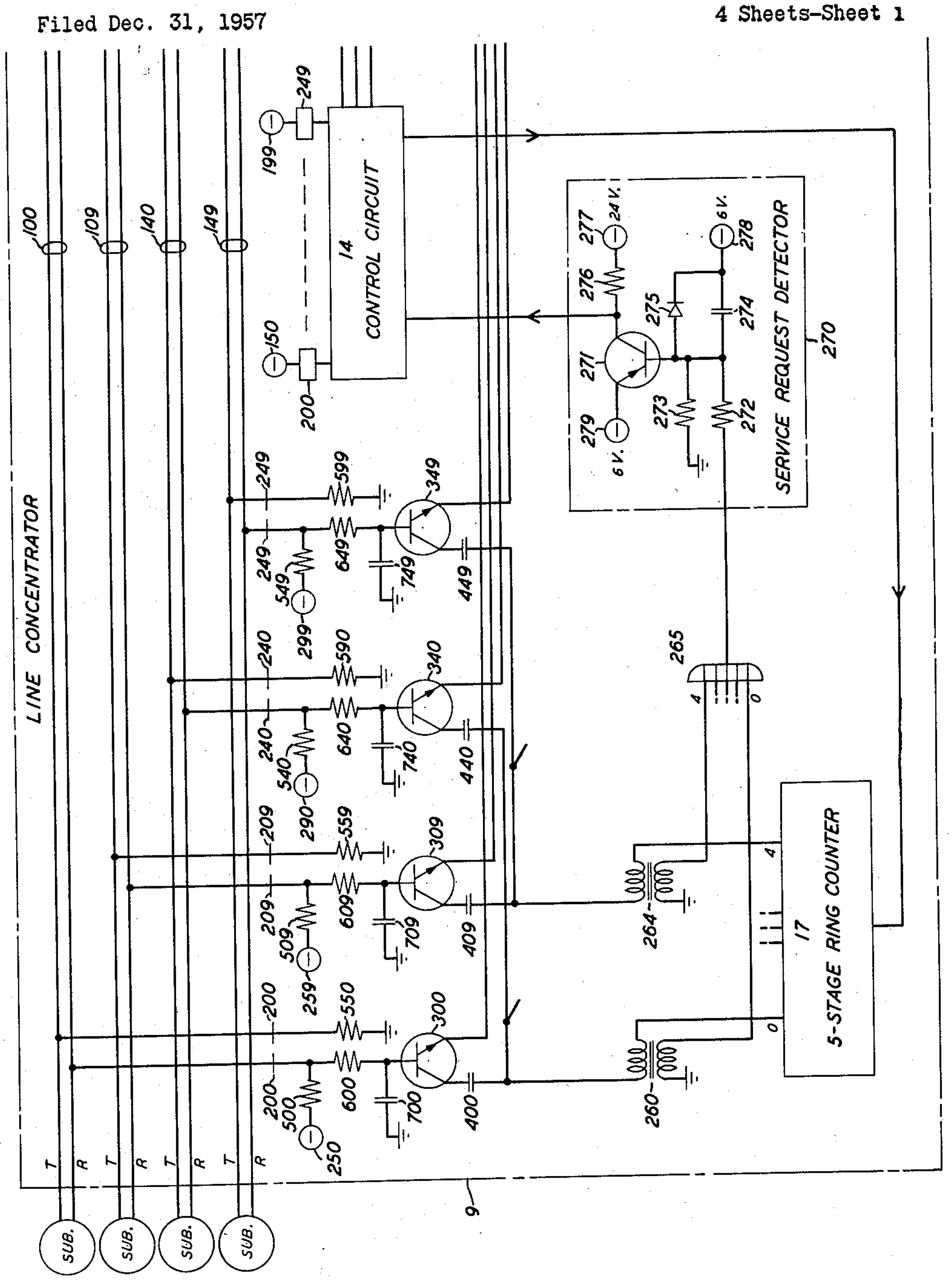
Figure 2:
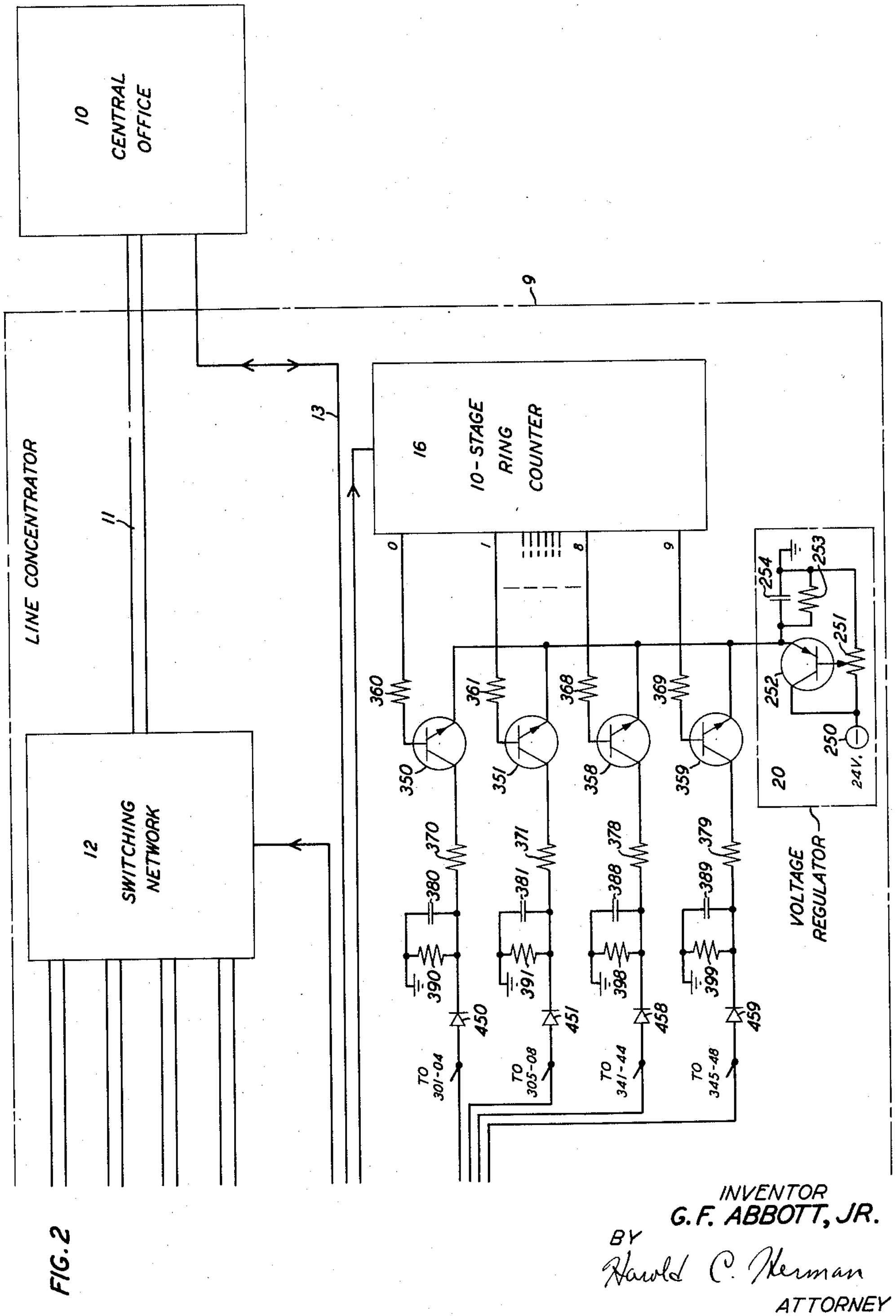

Referring to Figs. 1 and 2, the central office 10 is connected by a talking trunk 11 to a switching network 12 and by a signaling path 13 to a control circuit 14. The trunk 11 is one of ten trunks 11 which connect the central office 10 with the switching network 12. Both the switching network 12 and the control circuit 14, which are located in a remote line concentrator 9, and the central office 10, are described in detail in the above-identified disclosure by Abbott-Krom-Mehring-Whitney. The switching network 12 connects fifty subscriber lines 100–149 with the ten trunks 11, and the control circuit 14 transmits and receives information to and from the central office 10 and controls the operation of the network 12.

Figure 3:
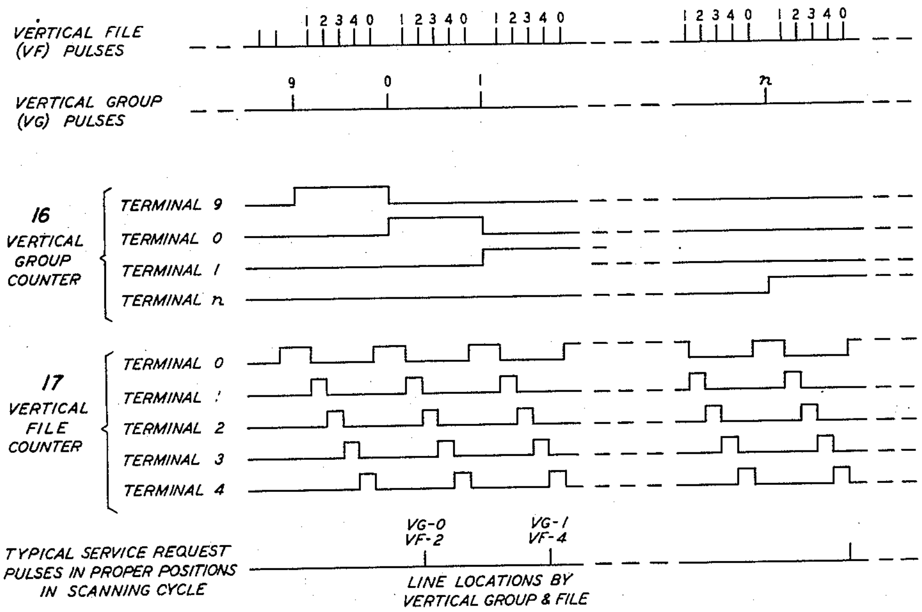
Fig. 3 is a series of curves illustrating the scanning pulse sequence utilized in the line circuit of the present invention.

The fifty subscriber lines 100–149 are cyclically scanned under control of the central office 10 which supplies scanning pulses through the control path 13 to the control circuit 14. The control circuit 14 supplies the scanning pulses, which are illustrated in Fig. 3, to a ten-stage ring counter 16 and to a five-stage ring counter 17. A ring counter is a continuous walking circuit or sequence circuit which advances one step for each input pulse supplied thereto. Counters of this type are disclosed in the Patent 2,812,385 of Joel-Krom-Posin which issued on November 5, 1957. The counters 16 and 17 are driven by the scanning pulses from the control circuit 14 to cyclically scan the fifty lines 100–149. The lines 100–149 are arbitrarily arranged in groups designated vertical groups and vertical files. Each vertical group includes five vertical files so that there are ten vertical groups in all for identifying the fifty lines 100–149. The scanning pulses, shown in Fig. 3, which are supplied to the control circuit 14, include vertical group pulses, which function to select the vertical group, and vertical files pulses, which function to select the vertical files in the selected group. Five vertical file pulses are supplied from the control circuit 14 to the ring counter 17 between each two vertical group pulses that are supplied from the control circuit 14 to the ring counter 16. Under control of the vertical group and vertical file pulses, the ring counters 16 and 17 cyclically provide a series of step pulses which are also illustrated in Fig. 3. As indicated in Fig. 3, the ring counter 17 completes one cyclical operation during one step of the ring counter 16.

When an output or step potential is provided on one of the leads 0–9 of the group counter 16, it operates an associated one of the ten transistors 350–359. The transistors 350–359 are NPN junction transistors having their base electrodes connected respectively through the base resistors 360–369 to leads 0–9 of the counter 16, their emitter electrodes connected to the voltage regulator 20 and their collector electrodes connected respectively through the resistors 370–379 and the varistors 450–459 to the emitter electrodes of the fifty transistors 300–49. The junctions between the resistors 370–379 and the varistors 450–459 are connected respectively through the resistors 390–399 and also through the capacitors 380–389 to ground. Each of the group transistors 350–59 is multiplied to five of fifty line or gate transistors 300–49. For example, the collector electrode of transistors 350 is connected through the resistor 370 and the varistor 450 to the emitter electrodes of the five line transistors 300–04. The fifty transistors 300–49 are associated individually with the fifty lines 100–49, with lines 100–04 and their associated transistors 300–04 being in vertical group 0.

As described above, the emitter electrodes of the ten transistors 350–59 are multipled to the voltage regulator 20. The voltage regulator 20 is a low impedance source of reference voltage which is utilized for regulating the sensitivity of the transistor gates including, respectively, the NPN junction transistors 300–49. The regulator 20 includes a PNP junction transistor 252 having its collector electrode connected to the minus 24-volt potential source 250, its base electrode connected to the center tap of the potentiometer 251 and its emitter electrode connected to the emitter electrodes of the transistors 350–59. The emitter electrode of the transistor 252 is also connected to ground through the capacitor 254 and the resistor 253.

The potential supplied by the voltage regulator 20 is less negative than the minus 24-volt source 250 as controlled by the adjustment of the potentiometer 251 which has one end terminal connected to ground and the other to the source 250. More specifically, the output potential supplied by the regulator 20 is determined by the voltage across the emitter-collector junction of the transistor 252 which is serially connected with resistor 253 between ground and the source 250. The conduction through the emitter-collector path is controlled by the emitter-to-base potential which is in turn controlled by the setting of the potentiometer 251. As is hereinafter described, the more negative the potential supplied by the regulator 20, the more sensitive are the transistors 300–49 to potential changes across lines 100–49. The potentiometer 251 is set to provide a relatively negative regulator output when the line concentrator 9 is located near the central office 10.

Assume by way of example that the potential provided by the voltage regulator 20 is minus 18 volts. The emitter electrodes of the transistors 350–59 are therefore at the minus 18-volt regulator potential. The base-to-emitter junction of only one of the transistors 350–59 is forward biased at any time since the normal potential at the leads 0–9 of the ring counter 16 is minus 24 volts. The step potential cyclically provided at the output terminals 0–9 is minus 8 volts so that the transistors 350–59 are successively saturated. When, for example, a step potential is provided at terminal 0 of the counter 16, the transistor 350 becomes conductive. The impedance between the collector electrode and the emitter electrode of the transistors 350–59 is high when the associated stage of the ring counter 16 is off and is essentially a short circuit when the associated stage is on. The current path through the collector and emitter electrodes of the transistor 390 is from ground through the resistors 390 and 370 and the collector and emitter electrodes of the transistor 350 to the regulator 20. When the transistor 350 is saturated, the potential supplied to the transistors 300–04 is approximately two-thirds the voltage supplied from the voltage regulator 20 due to the voltage divider effect of resistors 390 and 370. With a regulator voltage of minus 18 volts, a minus 12-volt potential is provided to the emitter electrode of each of the five transistors 300–04. The potential normally provided to the emitter electrodes of the transistors 300–04 is ground potential due to the connection of the emitter electrodes through the varistor 450 and the resistor 390 to ground.

When the transistor 350 is saturated, the potential at the emitter electrodes of the transistors 300–04 changes from ground potential to the minus 12-volt potential which is equal to two-thirds the potential supplied from the regulator 20. The minus 12-volt potential at the emitter electrodes of the transistors 300–04 is insufficient to initiate conduction because the emitter-base junctions of transistors 300–04 are normally reverse biased, respectively, by a minus 24-volt potential with sources 250–54. The base electrodes of the fifty transistors 300–49 are connected respectively through resistors 600–49 and resistors 500–49 to the minus 24-volt potential sources 250–99. The resistors 600–49 are also connected respectively through normal contacts of relays 200–49 to the ring leads of the lines 100–49.

Assuming that the line 100 is idle with the receiver on-hook, the resistance between the tip and the ring leads of the line 100 will be large and the potential at the base electrode of transistor 300 will be minus 24 volts. The tip leads of the lines 100–49 are connected respectively through normal contacts of the relays 200–49 and the resistors 550–99 to ground. When the line 100 is idle, the base potential is determined by the battery 250. The resistors 550–99 function to protect the contacts of the relays 200–49 from excessive currents due to foreign potentials, and capacitors 700–49, connected respectively between the base electrodes of transistors 300–49 and ground, serve to reduce the effects of alternating-current interference and to absorb transient surges due to lightning, etc. The varistors 450–9 function to protect the emitter junctions of the line transistors 100–49 against breakdown due to excessive reverse bias. The emitter junctions are normally reverse biased by 24 volts and have a breakdown potential of approximately 40 volts. The varistors 450–9 provide an additional protection as their breakdown potentials are also approximately 40 volts. Since the emitter electrode of transistor 300 is at minus 12 volts which is more positive than the minus 24-volt potential at the base electrode, conduction through the transistor 300 is inhibited and the emitter-collector junction impedance is high.

The transistor gate including the transistor 300 is in this manner disabled when the associated line is idle so that a pulse to the collector electrode of transistor 300 is inhibited. The pulses, which are supplied to the collector electrodes of the transistors 300–49, are vertical file step pulses supplied from the five-stage ring counter 17 respectively through the primary windings of the five transformers 260–64 and the capacitors 400–49. The secondaries of the transformers 260–64 are connected between ground and an OR circuit 265 which is connected to a service request detector 270. If a vertical file pulse from the counter 17 can pass through the primary winding of the associated one of the transformers 260–64, the detector 270 recognizes the secondary winding induced pulse as a service request indication. A pulse is allowed to pass through the primary winding of one of the transformers 260–64 only when one of the line transistors 300–49 connected thereto is saturated. Each of the transformers 260–64 is connected to ten of the transistors 300–49 and if any one of these ten transistors is saturated when the vertical file pulse is supplied, a service request indication is recognized. The identity of the line which initiates the service request is determined by its time position in the scanning cycle. The transistor 300 is one of the ten transistors 300, 305, 310, etc. in vertical file 0 which are connected to the transformer 260. With line 100 idle, the positive vertical file pulse from terminal 0 of the counter 17 is blocked at the transistor 300. The service request detector 270 recognizes the absence of an input pulse at its input as an indication that line 100 is idle.

If, however, the line 100 is in a service request condition with the receiver off-hook, the resistance across the tip and ring leads of the line 100 is relatively low so that the base electrode of the transistor 100 is near ground potential. The resistors 500 and 550 function together with the line impedance as a voltage divider to determine the potential at the base electrode of transistor 300. The potential at the base electrode changes to a value near ground potential when the line 100 assumes the service request condition because the resistance of the resistor 500 is much larger than that of the resistor 550. With the base electrode of transistor 300 near ground potential and the emitter electrode of transistor 300 at minus 12 volts due to the operation of the transistor 350, the emitter-base junction is forward biased to allow base current to pass through the transistor 300. With base current through the transistor 300, the impedance between its collector and emitter electrodes becomes very small. When the associated stage of the ring counter 17 is thereafter operated or turned on, a pulse is supplied from terminal 0 through the primary winding of transformer 260, capacitor 400, the collector-to-emitter path of transistor 300, varistor 450 and reistor 390 shunted by capacitor 380 to ground. The pulse through the primary winding of the transformer 260 induces a pulse in the secondary winding of the transformer 260 which is supplied through the OR circuit 265 to the service request detector 270.

The service request detector 270 includes a grounded emitter PNP junction transistor 271. Negative pulses applied through a resistor 272 to the base electrode of the transistor 271 result in positive pulses at the collector electrode. The collector electrode is normally at a potential of minus 24 volts due to its connection through resistor 276 to a minus 24-volt potential source 277. The emitter electrode is connected to a minus 6-volt potential source 279 which normally reverse biases the emitter electrode with respect to the base electrode. The base electrode is normally at a potential slightly positive with respect to the potential at the emitter electrode due to the biasing arrangement including a base resistor 273 and a varistor 275 which are serially connected between ground and a minus 6-volt potential source 278. The junction between resistor 273 and varistor 275 is connected to the base electrode of the transistor 271 so that the base electrode is at a potential of approximately minus 5.5 volts due to the 0.5 volt potential across the forward biased varistor 275. The varistor 275 is shunted by a small capacitor 274 which functions together with the secondary of the transformers 260–64 as an integrating network to suppress spurious pulses and oscillations of the transformer 260–64.

The negative input pulse from any of the transformers 260–64 forward biases the emitter junction causing the transistor 271 to saturate. The biasing path through resistor 273 and varistor 275 provide for a current threshold for the detector 270. Sufficient current must be provided to overcome the threshold and allow the varistor 275 to reverse bias. When sufficient current is provided to operate the transistor 271, the current through the resistor 276 causes the potential at the collector electrode to increase. The positive pulse at the collector electrode of the transistor 271 is provided through the control circuit 14 and the control path 13 to the central office 10. Responsive thereto the central office 10 establishes an originating or dial-tone connection through one of the trunks 11 and the switching network 12 to the service requesting line 100. The switching network 12 is operated under control of the central office 10 utilizing the path 13 and the control circuit 14.

When the control circuit 14 operates the network 12, it also operates the cut-off relay 200 which is associated with the line 100. The relays 200–49 are associated individually with the lines 100–49 and have their windings connected respectively between the circuit 14 and the batteries 150–99. When the relay 200 operates, it removes the transistor gate including transistor 300 from the line 100. The relay 200 remains operated to provide a cellar tip and ring connection from line 100 as long as the connection remains established through the network 12. With the relay 200 operated, the base potential of transistor 300 changes to minus 24 volts to disable the path through the transistor 300 for the vertical file pulses to the transformer 260.

In a typical telephone system, for example of the type disclosed in the Patent 2,585,904 which issued on February 19, 1952 to A. J. Busch, a line impedance below a predetermined level indicates a service request and a somewhat larger line impedance maintains the establishment of a connection to the service requesting line. In the crossbar telephone system disclosed in the above-identified Busch patent, a service request is recognized by the central office if the line resistance is decreased to 1840 ohms or less and an originating connection is held as long as the line resistance is 2210 ohms or less. These resistances are, of course, merely illustrative of impedances that can be utilized. The line resistance for initiating a service request is usually determined by the line resistance for tripping ringing on a terminating call. The difference between the holding impedance, or resistance, of 2210 ohms and the request impedance of 1840 ohms, or 370 ohms, is the margin against showering. Showering, as described above, is a condition wherein a service request is recognized and an originating connection is set up but then the originating central office equipment disconnects the connection. A showering condition, or cyclic connection and disconnection of the originating connection, occurs if a service request is recognized for a line impedance which is larger than the holding impedance. With 2210 ohms as the holding impedance, if a service request is initiated for a line impedance greater than 2210 ohms, showering results. A line impedance greater than 1840 ohms may initiate a service request because of variations in the components, relays, etc. The manufacturing tolerances of individual components may allow response deviations greater than 10 percent and cumulative response of a number of co-acting components is even greater. Moreover components and apparatus age and change their characteristics. It is these factors which require the margin, 370 ohms, against showering.

Figure 4:
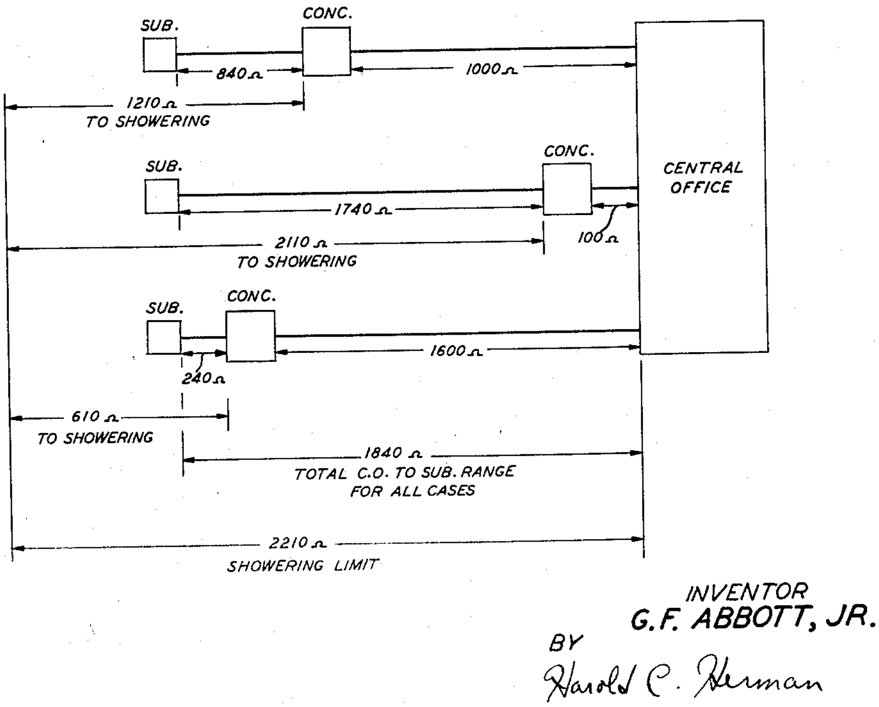
Fig. 4 is a functional representation illustrating a number of connections which prevent showering.

In line concentrator systems, the originating connection is longer than the subscriber line because it also includes the concentrator trunk as well as the subscriber line. For example the originating connection for line 100, as described above, includes one of the trunks 11. Fig. 4 illustrates, in terms of trunk resistance, three possible locations for the line concentrator 9 relative to the central office 10 and the maximum line impedances for each. With the line concentrator 9 located to provide a 1000-ohm trunk resistance, the line resistance cannot be greater than 840 ohms to remain within the 1840-ohm working limit of the central office. The further the line concentrator 9 from the central office, the shorter must be the lines 100–49 to maintain the showering margin.

As described above, the line resistances, or impedances, are translated to base potentials for the line or gate transistors 300–49 when service request conditions are initiated. The base potential is determined by the line impedance because it forms part of a voltage divider including the resistors 500 and 550 which are connected between the minus 24-volt battery 250 and ground. The larger the line impedance, the more negative is the applied base potential responsive to a service request condition. If the line impedance is very large, as for an on-hook or idle condition, the base potential is minus 24 volts as determined by the battery 250.

The sensitivity of the line transistors 100–09 are determined by their emitter potentials which are in turn determined by the potential supplied by the regulator 20. As described above, the emitter potential of transistors 100–04 is two-thirds the regulator potential when the transistor 350 is saturated. The regulator 20 is adjustable to vary the sensitivity of the line transistors 100–49 so that different line impedances may be utilized without decreasing the showering margin.

Suppose that the emitter potential of transistors 100–04 is fixed. Since the line concentrator 9 can be proximately as well as distantly located from the central office, it is desirable to permit line impedances approaching 1840 ohms as seen from the remote line concentrator 9 to initiate service requests. For example, as shown in Fig. 4, if the concentrator 9 is at a distance equivalent to 100 ohms trunk impedance, the line concentrator 9 should recognize a service request if the impedance of a line reduces to 1740 ohms. For a line loop of 1740 ohms, the applied base potential to the respective line transistor 100–49 is minus 10.6 volts as determined by the voltage divider operation of the resistors connected to the line. In order for one of the transistors 100–49 to recognize a service request from a 1740-ohm line, its emitter potential therefore must be more negative than minus 10.6 volts.

With a fixed emitter potential of 10.6 ohms, locating the line concentrator 9 further away from the central office 10 reduces the margin against showering because service requests are recognized from line impedances up to 1740 ohms and the trunk impedance is larger than 100 ohms. In fact if the trunk impedance is greater than 470 ohms, showering is almost definite because the total loop impedance from the central office is then greater than the holding impedance of 2210 ohms.

Figure 5:
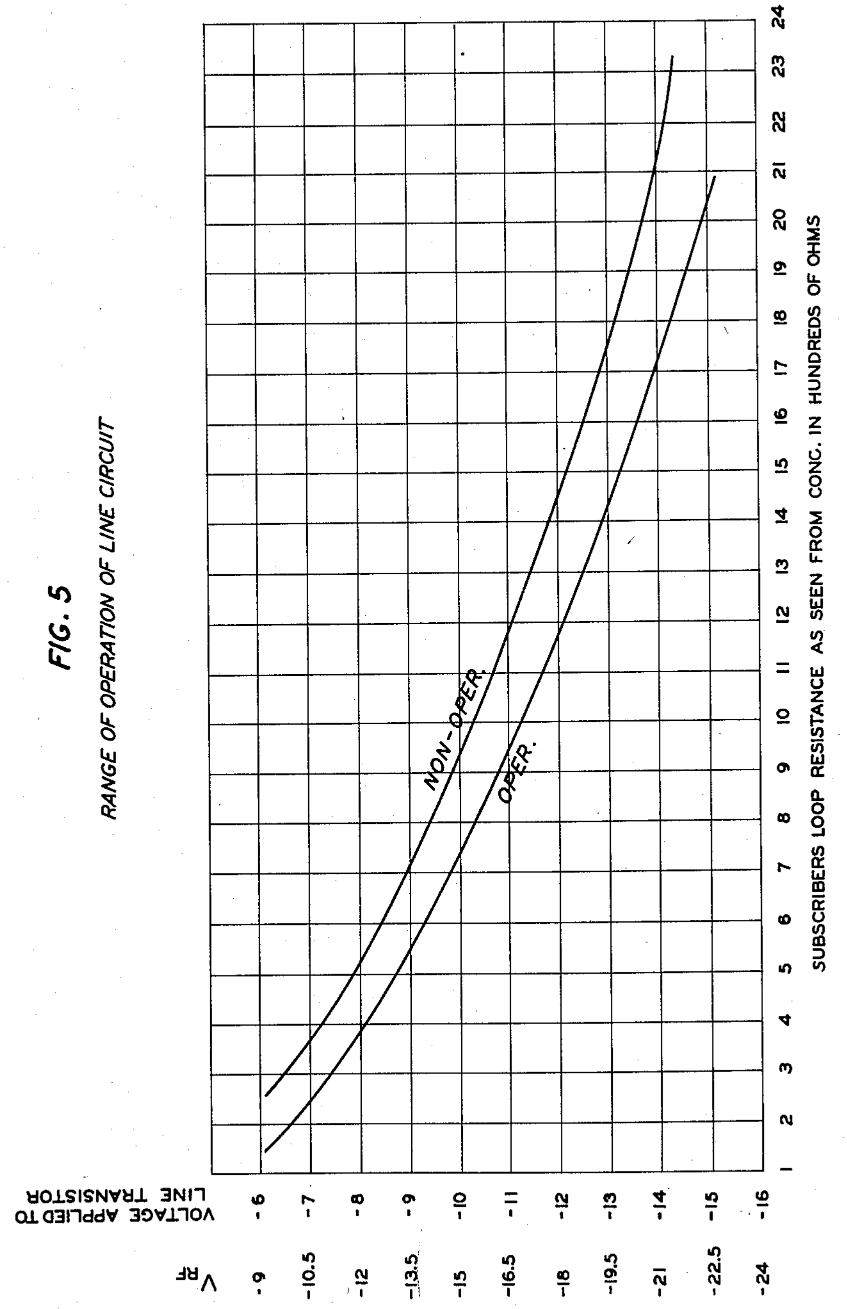
Fig. 5 is a graph illustrating the marginal region of uncertainty between definite recognition and nonrecognition of service requests for different regulator potentials.

The adjustable regulator 20 may be set for different maximum line impedances to maintain the showering margin. The curves shown in Fig. 5 illustrate the area of uncertainty between a definite recognition of a service request and a definite nonrecognition for different regulator outputs. For example, if the output of the regulator is minus 18 volts, as described above, the voltage supplied to the line transistors 100–49 is minus 12 volts, a line resistance of 1165 ohms initiates a service request and an impedance of 1440 ohms is not recognized as a service request. Line resistances between 1165 and 1440 ohms may or may not provide a service request. The reason for the area of uncertainty is due to manufacturing component variations and due to the base current requirement of the line transistors 100–49. With minus 12 volts at the emitter electrode of one of the transistors 100–49, the threshold potential at the base is also minus 12 volts. At just the threshold potential, the vertical file pulse is blocked because of the absence of transistor base current. The marginal region exists between the threshold potential and a potential which provides for sufficient base current to permit the passage of an adequate pulse through the collector-emitter junction. An adequate pulse is required to induce a detectable pulse for the detector 270.

The alphas, or current amplification factors, of the line transistors 100–49, bears strongly on the width of this marginal region; the higher the alpha the narrower the marginal region.

The marginal region is small compared to the marginal region utilizing passive components because once sufficient base current exists in one of the line transistors 100–49, it effectively isolates its associated line from the line scanning equipment. Moreover, as described above, the gain provided by the line transistors functions to reduce the range of uncertainty.

As long as the marginal region is less than 370 ohms, showering is improbable. For example, referring to Figs. 3 and 4, if the trunk impedance is 1000 ohms, the regulator potential is set at minus 16.05 volts to provide for definite recognition of line impedances of 840 ohms. The total loop impedance to the central office 10 is therefore 1840 ohms to provide for a margin against showering of 370 ohms. The area of uncertainty for a regulator potential of minus 16.05 volts is from 840 ohms to 1050 ohms, or 310 ohms. The worst condition therefore still leaves a margin against showering of 370 less 310 or 60 ohms.

It is to be understood that the above-described arrangements are illustrative of the application of the principles of this invention. Numerous other arrangements may be devised by those skilled in the art without departing from the spirit and scope of the invention.

What is claimed is:

1. A line circuit comprising a subscriber line having a pair of leads, a transistor associated with said line having base, emitter and collector electrodes, means connecting said base electrode to one of said pair of leads, a circuit arrangement connected to the other one of said pair of leads, a first pulse source connected to said emitter electrode of said transistor, a second pulse source connected to said collector electrode of said transistor, biasing means connected to said base and emitter electrodes of said transistor, a service request detector coupled to said collector electrode of said transistor, means normally blocking the passage of pulses from said second pulse source to said detector, and means including said transistor effective when said line is in a service request condition and a pulse is being supplied from said first pulse source to unblock the passage of a pulse from said second pulse source to said detector.

2. A line circuit for signaling the idle and service request conditions of a subscriber line in a telephone system comprising a telephone, a subscriber line having a pair of wires connected to said telephone, a voltage dividing network connected to said line comprising a first circuit arrangement connected to one wire of said pair and a second circuit arrangement connected to the other wire of said pair, said second circuit arrangement including a transistor having base, emitter and collector electrodes, means connecting said base electrode to said other wire of said pair whereby the condition of said line controls the potential at said base electrode, means for supplying an enabling potential to said emitter electrode, and means for supplying a control potential to said collector electrode during the time said enabling potential is at said emitter electrode whereby the condition of said line is determined.

3. A line circuit in a remote line concentrator system comprising a subscriber line having a pair of leads, a first potential source, means connecting said first potential source to one of said pair of leads, a circuit arrangement connected to the other of said pair of leads, a first transistor having emitter, base and collector electrodes, means connecting said base electrode to said first potential source, a second transistor having emitter, base and collector electrodes, means connecting said collector electrode of said second transistor to said emitter electrode of said first transistor, a biasing arrangement connected to said emitter electrode of said second transistor, means for supplying a control potential to said base electrode of said second transistor whereby an enabling potential is provided at the emitter electrode of said first transistor, and means for supplying a control pulse to said collector electrode of said first transistor during the time that said control potential is provided to said base electrode of said second transistor.

4. A line circuit in accordance with claim 3 wherein said biasing arrangement includes means for adjusting the potential at said emitter electrode of said second transistor whereby the sensitivity of said first transistor to impedance changes of said subscriber line is changed.

5. An electrical system for scanning a plurality of lines each comprising a pair of wires and for transmitting information indicating the condition of lines to a central office remote from said lines comprising a transistor gate for each of said lines, each of said transistor gates comprising a transistor having base, emitter and collector electrodes, means connecting said base electrode of said transistor in each of said gates to one of said associated pair of wires, means for successively supplying control potentials to said emitter electrodes of said transistors of groups of said gates, a detector coupled to said collector electrode of said transistor in each of said gates, and means for successively supplying a reading pulse to said collector electrodes of said transistors in each of said groups whereby the condition of said associated lines is successively determined at said detector.

6. An electrical system in accordance with claim 5 comprising in addition adjusting means for predetermining the magnitude of said control potentials supplied by control potential supplying means whereby the sensitivity of said transistor gates to the conditions of said lines is predetermined.

7. A scanning unit for providing indications of the service condition of a telephone subscriber line comprising a first and a second gating circuit arrangement, said first gating circuit arrangement having a transistor including a base electrode connected to said subscriber line, an emitter electrode for receiving enabling pulses from said second gating circuit arrangement and a collector electrode for receiving scanning pulses for determining the service condition of said line, said second gating circuit arrangement having a transistor including a collector electrode, an emitter electrode and a base electrode, means connecting said collector electrode of said transistor in said second gating circuit arrangement to said emitter electrode of said transistor in said first gating circuit arrangement, biasing means connected to said emitter electrode of said transistor in said second gating circuit arrangement, biasing means connected to said base electrode of said transistor in said first gating circuit arrangement, means for supplying an enabling control potential to said base electrode of said transistor in said second gating circuit arrangement, and means connected to said collected electrode of said transistor in said first gating circuit arrangement for supplying a scanning pulse.

8. A scanning unit in accordance with claim 7 wherein said first-mentioned biasing means includes a potential source and an adjustable impedance connected between said potential source and said emitter electrode of said transistor in said second gating circuit arrangement.

9. A scanning unit in accordance with claim 8 wherein said adjustable impedance includes a transistor having an emitter electrode connected to said collector electrodes in said second gating circuit arrangement, a collector electrode and a base electrode, a potentiometer connected between said base and collector electrodes of said transistor in said adjustable impedance, and biasing means connected to said collector and emitter electrodes of said transistor in said adjustable impedance.

10. A line scanner for determining the condition of a plurality of lines comprising a plurality of gate circuits individually associated with said lines, means for controlling the condition of each of said gate circuits in accordance with the condition of the associated one of said lines, means for successively supplying scanning pulses to said gate circuits, means common to said plurality of gate circuits for supplying a control potential to each of said gate circuits which determines the sensitivity of said gate circuits to changes in condition of said lines, and means for adjusting said control potential supply means to simultaneously change the sensitivity of each of said gate circuits.

References Cited in the file of this patent

UNITED STATES PATENTS

| | | |
|---|---|---|
| 2,840,125 | Elliott | Apr. 8, 1958 |
| 2,841,651 | Trousdale | July 1, 1958 |